Patented June 28, 1949

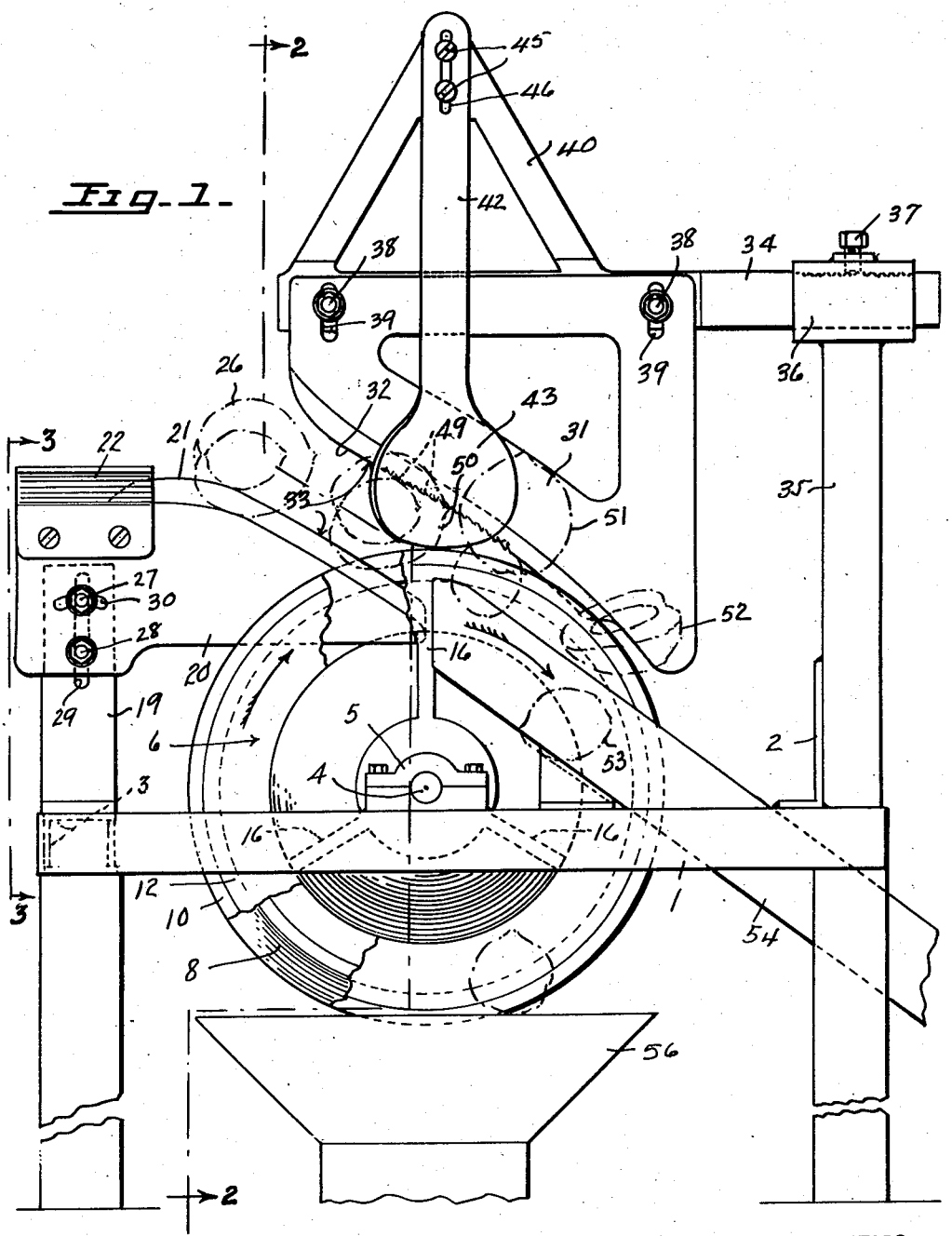

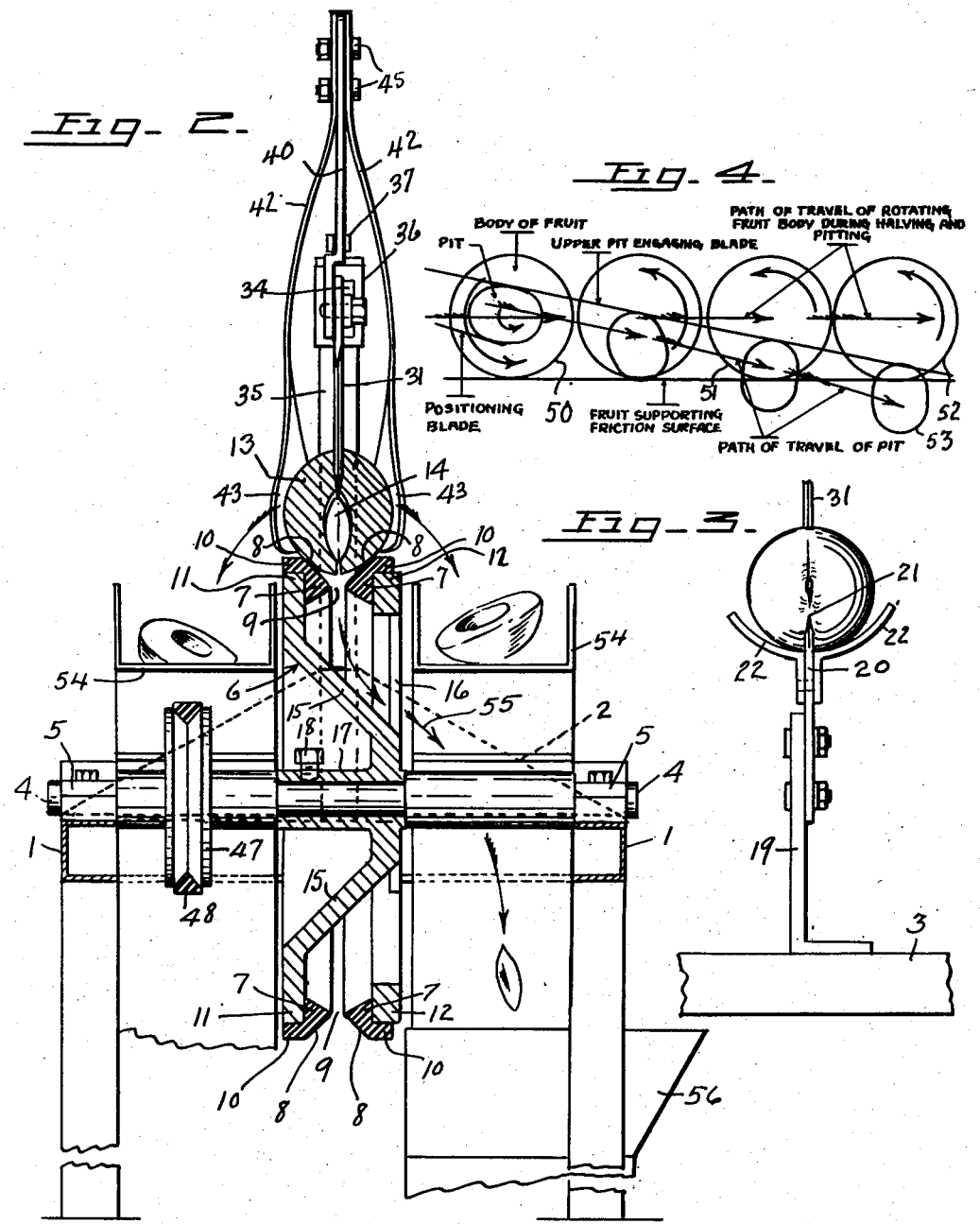

2,474,492

UNITED STATES PATENT OFFICE 2,474,492

APPARATUS FOR HALVING AND PITTING APRICOTS

Joseph Perrelli and John Perrelli, Richmond, Calif., assignors to Perrelli Freestone Machine, Inc., Richmond, Calif.

Application September 25, 1944, Serial No. 555,632

5 Claims. (Cl. 146—17)

This invention relates to a fruit pitter and halver for pitting and halving drupes such as apricots and the like in which the pits are relatively free from the body of each fruit.

Heretofore apricots for canning or drying are generally halved and pitted by hand, the fruit being held in one hand of the operator and cut around the pit suture by a knife held in the other hand. Some canners provide special devices having spaced cutting blades with their cutting edges in opposed relation and defining opposite sides of a path having a right angle change of direction for bisecting and halving apricots. Such devices, however, require manual moving and manipulating of each apricot during the entire halving and pitting operation.

One of the objects of this invention is the provision of an apricot pitter and halver in which the only manual operation necessary is the one of feeding the apricots to the machine on a single positioner, the fruit being halved and pitted automatically.

Another object of this invention is the provision of a pitter and halver capable of halving and pitting apricots and the like as rapidly as the operator is able to feed apricots into the same.

A still further object of the invention is the provision of an apricot halver and pitter that is simple, safe, rapid and that is economical to make.

In addition an object is an improved method of halving and pitting apricots.

Other objects and advantages will appear in the drawings and description.

In the drawings, Fig. 1 is a side view of an apparatus for carrying out the method of this invention. Parts are broken away to show structure and the apricots are indicated in dot-dash line.

Fig. 2 is a sectional view taken generally along line 2—2 of Fig. 1, the apricots being indicated in full line and in section.

Fig. 3 is a fragmentary edge view of the positioner as seen from line 3—3 of Fig. 1.

Fig. 4 is a diagrammatic view of one concept of the method of this invention independently of the particular apparatus of Figs. 1 to 3.

In detail, the apparatus of Figs. 1 to 3 comprises a frame having side frame members 1, a rear frame member 2 and a front frame member 3. A shaft 4 is rotatably supported in bearings 5 on frame members 1, said shaft having an annular fruit supporting member 6.

The fruit supporting member 6 is provided with peripheral spaced, annular strips 7. These strips, as seen in Fig. 2, may be generally triangular in cross-sectional contour with their apices adjacent and in opposed relation whereby the radially outwardly facing sides 8 of said strips will coact to form an outwardly opening V-shaped channel with a slot 9 at the base or apex of the V. Strips 7 may also be provided with extensions 10 overlying the outer edges of the portions 11, 12 of member 6.

As best seen in Fig. 2, an apricot 13 is adapted to be supported on the inclined outer sides 8 of the strips 7 with the pit 14 of the apricot over slot 9. The strips 7 may be of friction material, such as rubber or the like, and it is sufficiently soft to yield under slight pressure. Thus any pressure on the apricot tending to press it against the supporting strips will not cause injury to the apricot where the latter engages the strips and such pressure will minimize any tendency of the fruit to slip relative to said strips.

The portion 11 supporting one of the strips 7 has a laterally projecting conical extension 15 that is coaxial with shaft 4. The smaller diameter end of said extension is below portion 12 that supports the other strip 7, and several spokes 16 may extend from said smaller diameter end to said portion for supporting the latter for rotation with portion 11. This conical extension will function to deflect pits forced through slot 9 axially outwardly of the annular fruit supporting member as will later be described.

A hub 17 integral with extension 15 is secured on shaft 4 by set screw 18 or by any other suitable means.

The front cross frame member 3 carries an upright 19 that supports a vertical blade 20 at its upper end. This blade 20 extends from the upright into slot 9 between strips 11, and is provided with an upper cutting edge 21 that may extend generally tangentially relative to strips 11 from a point about over shaft 4 (Fig. 1). This blade 20 is a fruit positioning blade, and a pair of divergent wings 22 may be provided over upright 19 between which an apricot may be initially supported for sliding of the same longitudinally of said edge 21. In Fig. 1 an apricot is indicated at position 26 supported on said blade with the pit riding on cutting edge 21 for movement longitudinally of said edge toward the strips 7. Obviously the wings 22 may be omitted if desired.

The blade 20 is supported on upright 19 for adjustment in practically any direction in the plane thereof relative to the strips 7, but it is always coplanar with a vertical plane midway between the adjacent edges of strips 7. Bolts 27, 28 extending through slots 29, 30 that are respectively formed in the upright 19 and blade 20 provide for the raising or lowering of blade 20 or for swinging the blade about bolts 28, the latter extending through slot 29 in said upright.

Coplanar with blade 20 and over the annular fruit supporting member 6 is a second blade 31 having a generally downwardly facing cutting edge 32 that extends generally tangentially upwardly from said member 20 from a point spaced from the outer end of blade 20. This cutting edge 32 may extend substantially parallel with edge 21 of blade 20 and over said edge 21 at its portion remote from said element 6 providing a space 33 between the opposed edges of said blades. This space in every instance should be wider than the maximum length of the pits in apricots being pitted, but less than the diameter of the said apricots.

Blade 31 may be supported on a horizontal arm 34 that is in turn adjustably secured on the upper end of a vertical post 35. Post 35 is secured to rear cross frame member 2. The arm 34 extends slidably through a tubular element 36 on post 35 and a set screw 37 threadedly extending through said element may adjustably secure said arm in any desired extension from said element 36.

Blade 31 is adjustably secured to arm 34 by bolts 38 extending through slots 39 in said blade, said slots being generally vertical to permit raising or lowering of the blade 31 or tilting of the same in one direction or the other about either of said bolts. Thus practically any desired relationship may be procured between the edges of blades 20, 31 and between either or both blades and strips 7. The blades 20, 31 will always be coplanar when in any of the adjusted positions.

The arm 34 may carry an upward projection 40 that carries from its upper end spring arms 42 depending from opposite sides thereof. These arms 42 have enlargements 43 at their lower ends so positioned and arranged relative to each other as to frictionally engage the opposite outer sides of each apricot that moves from position 26 (Fig. 1) into engagement with the strips 7. In Fig. 2 the apricot 13 is indicated between said enlargements 43. The tension or force with which said enlargements 43 engage the opposite sides of each apricot is only substantially enough to hold the opposite halves of the apricot upright during cutting thereof, as will be explained later.

The said arms 42 may be secured to projection 40 by bolts 45 extending through slots 46 (Fig. 1) in each arm so that said arms may be adjusted longitudinally thereof if desired.

The shaft 4 may carry a pulley 47 (Fig. 2) having a belt 48 connected with any suitable source of power (not shown) for rotating the annular fruit supporting member clockwise (as seen in Fig. 1). Any other conventional means may be employed to so rotate the said shaft at the desired speed.

In operation the operator positions each apricot on blade 20 with its suture in the plane of said blade (Fig. 3) and then quickly moves the same along said blade and impaled thereon longitudinally of cutting edge 21 toward the blade 31 which will impale the fruit on substantially the opposite side from blade 20. Upon the fruit so impaled, engaging the surface 8 of strips 7, the cutting edge 32 of blade 31 is so arranged that it will engage the pit 14 (Figs. 1, 2) of the apricot at a point along its suture opposite the side thereof that is adjacent strips 7. At this point or extending from opposite sides of said point, the cutting edge of blade 31 may be slightly notched or serrated as indicated at 49 (Fig. 1).

Upon such engagement between blade 31 and the pit the apricot and pit will be caused to rotate counterclockwise and at the same time to be moved in the direction of rotation of the fruit supporting member 6. Previously to such rotation the body of the apricot had been cut to the pit on one side by blade 20, and as the rotation of the said body by engagement thereof with strips 7 commenced slightly before the body had left blade 20, the said rotation will cause a further cutting of the body in the plane of its suture by said blade 20.

Immediately upon engagement between the pit and the cutting edge of blade 31 the pit will be progressively forced out of the body of the apricot through the cut previously formed by the blade 20.

In position 50 of an apricot (Figs. 1, 4) the blade 31 has just engaged the pit at a point along its suture. In position 51 the apricot has been rotated and the pit is free and is being forced through slot 9 between strips 7. In position 52 the pit 53 has been forced through the slot 9 and the halves are free from the retaining members 43 for falling into any desired conveying means 54 at opposite sides of member 6 for carrying away. The pits forced through slot 9 will generally follow the path 55 (Fig. 2) for dropping into a chute 56 or onto any desired conveying means for removal separate from the halves.

The capacity of the device for halving and pitting apricots is equal to the speed at which apricots may be fed thereto. Inasmuch as the blades 20, 31 will support the fruit against dislodgment once the fruit is impaled between said blades, the operator need not force each fruit into engagement with the strips 7. The fruit may be forced along the blades by each newly positioned fruit and the strips 7 in cooperation with blade 31 will automatically complete the pitting and bisecting operation as the leading fruit is pushed along the blades to the position 50.

The diagrammatic view (Fig. 4) clearly shows that the bodies of the fruit and the pits move along divergent paths of travel while the body of each apricot or fruit is cut by rotation of the fruit for permitting the pit to be pushed therefrom without mutilating the fruit halves.

It is to be clearly understood that the apparatus herein disclosed is merely illustrative of one form of apparatus adapted to accomplish the desired results in the manner described, and is not intended to be restrictive of the invention. Also the invention is not to be restricted to use in connection with apricots, but covers any fruit adapted to be pitted and halved, as described.

We claim:

1. A pitter for apricots and the like comprising a cutting blade having a cutting edge for cutting through one side of a whole apricot to a point on the suture of its pit, a support spaced from said blade engageable with the outer surface of such apricot at the side of the body opposite said point for holding the said point in engagement with said blade, means for moving said support in one direction generally longitudinally of said cutting edge from the point at which said pit is adapted to engage said edge but slightly convergently relative to said edge whereby progressively increased frictional resistance between said edge and said pit will effect rotation of said apricot on said support and bisecting of the body of said apricot together with freeing the pit from said body said blade being free at its opposite sides in the planes of the latter for movement of the fruit halves thereover in said planes in direction away from said edge during engagement of said halves by said support.

2. A pitter for apricots and the like comprising a cutting blade having a cutting edge for cutting through one side of a whole apricot to a point on the suture of its pit, a support spaced from said blade engageable with the outer surface of such apricot at the side of the body opposite said point for holding the said point in engagement with said blade, means for moving said support in one direction generally longitudinally of said cutting edge but slightly convergently relative to said edge whereby progressively increased frictional resistance between said edge and said pit will effect rotation of said apricot on said support and bisecting of the body of said apricot together with freeing the pit from said body, said support being spaced elongated strips of resilient friction material said blade being free at its opposite sides in the planes of the latter for movement of the fruit halves thereover in said planes in direction away from said edge during engagement of said halves by said support.

3. A pitter for apricots and the like comprising a cutting blade having a cutting edge for cutting through one side of a whole apricot to a point on the suture of its pit, a support spaced from said blade engageable with the outer surface of such apricot at the side of the body opposite said point for holding the said point in engagement with said blade, means for moving said support in one direction generally longitudinally of said cutting edge but slightly convergently relative to said edge whereby progressively increased frictional resistance between said edge and said pit will effect rotation of said apricot on said support and bisecting of the body of said apricot together with freeing the pit from said body, said support being an annular member with its peripheral surface so engageable with said apricot, means supporting said member for rotation about its axis, the peripheral surface of said member being generally V-shape in cross sectional contour with the open side of the V facing radially outwardly whereby said surface will engage said apricot as points at opposite sides of the apex of said V and will tend to hold the halves together against lateral separation from each other.

4. A pitter for apricots and the like comprising means for holding each apricot to be pitted with its suture in a vertical plane, a blade in said plane having its cutting edge arranged for cutting through one side of each such apricot to a point on the suture of its pit, means for rotating each such apricot about its central axis that is at right angles to said cutting edge when each apricot is so supported and for holding the pit of each apricot with its pit in engagement with said edge at said point, said last mentioned means comprising a pair of elongated strips of resilient material movable longitudinally thereof and adapted to engage the outer side of such apricot at spaced points at the side thereof opposite said points said strips being spaced apart for edgewise passage of each pit therebetween upon each apricot being bisected, and said blade being disposed generally above said strips and in a plane bisecting the space between said strips.

5. A pitter for apricots and the like comprising means for holding each apricot to be pitted with its suture in a vertical plane, a blade in said plane having its cutting edge arranged for cutting through one side of each such apricot to a point on the suture of its pit, means for rotating each such apricot about its central axis that is at right angles to said cutting edge when each apricot is so supported and for holding the pit of each apricot with its pit in engagement with said edge at said point, said last mentioned means comprising a pair of spaced coaxial annular members, a shaft supporting said members for rotation on their common axes with said members in engagement with the outer surface of such apricot, the cutting edge of said blade extending generally tangentially relative to said annular members and in a plane between the latter for urging the pit of each apricot to between said members, means for conducting pits removed from such apricots and the bisected halves of the latter along separate paths of travel away from said members.

JOSEPH PERRELLI.
JOHN PERRELLI.

REFERENCES CITED

The following references are of record in the file of this patent:

UNITED STATES PATENTS

| Number | Name | Date |
| --- | --- | --- |
| 484,154 | Howell | Oct. 11, 1892 |
| 1,365,166 | Garman | Jan. 11, 1921 |
| 1,605,532 | Duncan | Nov. 2, 1926 |
| 1,653,552 | Duncan | Dec. 20, 1927 |
| 1,785,000 | Duncan | Dec. 16, 1930 |
| 1,785,009 | Duncan | Dec. 16, 1930 |
| 2,259,332 | Winkelman | Oct. 14, 1941 |
| 2,314,066 | Ballou et al. | Mar. 16, 1943 |